US012372650B2

(12) United States Patent
Seki

(10) Patent No.: US 12,372,650 B2
(45) Date of Patent: Jul. 29, 2025

(54) INSPECTION SYSTEM AND METHOD FOR CONTROLLING THE SAME, AND STORAGE MEDIUM

(71) Applicant: CANON KABUSHIKI KAISHA, Tokyo (JP)

(72) Inventor: Hirotaka Seki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 277 days.

(21) Appl. No.: 17/942,225

(22) Filed: Sep. 12, 2022

(65) Prior Publication Data

US 2023/0119179 A1 Apr. 20, 2023

(30) Foreign Application Priority Data

Sep. 27, 2021 (JP) .................................. 2021-156808

(51) Int. Cl.
*G01S 17/04* (2020.01)

(52) U.S. Cl.
CPC .................................... *G01S 17/04* (2020.01)

(58) Field of Classification Search
None
See application file for complete search history.

(56) References Cited

U.S. PATENT DOCUMENTS

| | | | | |
|---|---|---|---|---|
| 7,342,230 B2 * | 3/2008 | Adamski | ............ | G01N 21/3581 378/146 |
| 9,262,692 B2 * | 2/2016 | Kane | ........................ | G01V 5/22 |
| 9,395,296 B1 * | 7/2016 | Milton | ...................... | G02B 6/06 |
| 11,199,496 B2 * | 12/2021 | Krausz | ............... | G01N 21/3586 |
| 11,293,860 B2 * | 4/2022 | Zheng | ................. | G01N 21/3586 |
| 11,616,918 B2 * | 3/2023 | Sato | .......................... | H01Q 1/38 250/332 |
| 11,815,472 B2 * | 11/2023 | Nakayama | ............. | G01R 27/06 |

(Continued)

FOREIGN PATENT DOCUMENTS

| | | |
|---|---|---|
| JP | 2004325308 A | 11/2004 |
| JP | 2014170014 A | 9/2014 |

(Continued)

OTHER PUBLICATIONS

The above foreign patent documents were cited in the Jun. 3, 2026 Japanese Office Action, which is enclosed without an English Translation, that issued in Japanese Patent Application No. 2021-156808.

*Primary Examiner* — David P Porta
*Assistant Examiner* — Djura Malevic
(74) *Attorney, Agent, or Firm* — Cowan, Liebowitz & Latman, P.C.

(57) ABSTRACT

An inspection system comprises a plurality of image capturing systems including a first image capturing unit, a first irradiation unit corresponding to the first image capturing unit, a second irradiation unit that does not correspond to the first image capturing unit but corresponds to a second image capturing unit and in which the irradiated terahertz waves are directly incident to the first image capturing unit, and a control unit that controls the plurality of image capturing systems such that the timing of a period of image capturing of the first image capturing unit and the timing of a period of irradiation of the terahertz waves of the second irradiation unit is different.

12 Claims, 12 Drawing Sheets

(56) References Cited

U.S. PATENT DOCUMENTS

| | | | | |
|---|---|---|---|---|
| 11,835,562 B2* | 12/2023 | Saito | | G02F 2/02 |
| 2005/0110672 A1* | 5/2005 | Cardiasmenos | | G01N 21/3581 |
| | | | | 250/330 |
| 2007/0085009 A1* | 4/2007 | Adamski | | G01J 3/42 |
| | | | | 250/341.8 |
| 2007/0114418 A1* | 5/2007 | Mueller | | G01J 3/42 |
| | | | | 250/341.1 |
| 2007/0211922 A1* | 9/2007 | Crowley | | G07C 9/37 |
| | | | | 382/115 |
| 2009/0072146 A1* | 3/2009 | Youngner | | G01V 8/005 |
| | | | | 250/341.1 |
| 2010/0148071 A1* | 6/2010 | Shioda | | G01N 21/3581 |
| | | | | 702/77 |
| 2011/0121209 A1* | 5/2011 | Thiel | | G01N 21/3581 |
| | | | | 250/493.1 |
| 2012/0092493 A1* | 4/2012 | Tsutsui | | H04N 7/185 |
| | | | | 348/143 |
| 2013/0114855 A1* | 5/2013 | Kane | | G01V 5/22 |
| | | | | 382/103 |
| 2013/0214162 A1* | 8/2013 | Treado | | G01J 3/44 |
| | | | | 250/340 |
| 2017/0307515 A1* | 10/2017 | Nawata | | G01N 21/17 |
| 2019/0020811 A1* | 1/2019 | Tzuang | | H04N 23/56 |
| 2020/0067170 A1* | 2/2020 | Sato | | H01Q 15/14 |
| 2020/0173783 A1* | 6/2020 | Anantha | | G06T 7/70 |
| 2020/0293806 A1* | 9/2020 | Sato | | G06V 20/10 |
| 2020/0296265 A1* | 9/2020 | Itsuji | | G06V 10/143 |
| 2021/0112647 A1* | 4/2021 | Coleman | | G01S 17/42 |

FOREIGN PATENT DOCUMENTS

| | | |
|---|---|---|
| JP | 2020-115107 A | 7/2020 |
| JP | 2020153974 A | 9/2020 |
| WO | 2021255964 A | 12/2021 |

\* cited by examiner

INSPECTION SYSTEM AND METHOD FOR CONTROLLING THE SAME, AND STORAGE MEDIUM

BACKGROUND OF THE INVENTION

Field of the Invention

The present invention relates to an inspection system and a method for controlling the same, and a storage medium

Description of the Related Art

In recent years, the prevention of crimes committed at airports and the like by concealed dangerous objects has become an issue, and technologies for detecting carried dangerous objects are sought. As one of these inspection technologies, an active terahertz system that utilizes terahertz waves is known.

In an active terahertz system, a terahertz wave is irradiated toward an inspection target, and the terahertz wave reflected from the inspection target is detected by a terahertz camera, thereby performing image capture and inspection. Note that a terahertz wave (also referred to as "terahertz light") can be defined as an electromagnetic wave having a frequency between 30 GHz or more and 30 THz or less.

For the detection of dangerous objects at the time of airline security checks, inspection by using a metal detector, in which the inspection target is mainly a person, and inspection by using an X-ray inspection device, in which the inspection target is mainly an item of baggage, are known. However, there is a problem in that these inspection systems require time for inspection. In an airport or the like where there are a large number of users, metal detectors and X-ray inspection machines may greatly reduce the convenience of users, and the detection of dangerous objects in a public transportation facility has not yet been realized.

Japanese Patent Application Laid-Open No. 2020-115107 discloses an inspection system that includes a plurality of terahertz illuminators that illuminate terahertz waves and a plurality of cameras that detect terahertz waves, and the terahertz waves reflected by a dangerous object are detected by the cameras. Japanese Patent Application Laid-Open No. 2020-115107 also discloses an active terahertz system disposed in a public transportation facility.

However, if a large number of terahertz illuminator are provided, terahertz waves from other terahertz illuminator are directly irradiated to a camera, which may cause overexposure, and there is a concern that the exposure of terahertz waves reflected from a dangerous object becomes unclear.

In light of the above described problem, it is one exemplary object of the present invention to provide, in an inspection system including a plurality of terahertz illumination units and image capturing units, a technology that maintains image quality and is advantageous for crime prevention without considering the respective disposal of the illumination units and the image capturing units.

SUMMARY OF THE INVENTION

In order to solve the above problem, according to one aspect of the present invention, an inspection system comprising:

a plurality of image capturing systems each of which includes:
an irradiation unit that irradiates a terahertz wave to an inspection target, and
an image capturing unit that captures an image of the inspection target by detecting a reflected wave from the inspection target that has been irradiated with the terahertz wave by a corresponding irradiation unit, and
at least one processor or circuit configured to function as:
a control unit configured to control the irradiation unit and the image capturing unit of each of the plurality of image capturing systems,
wherein the plurality of image capturing systems includes:
a first image capturing unit,
a first irradiation unit corresponding to the first image capturing unit, and
a second irradiation unit that does not correspond to the first image capturing unit but corresponds to a second image capturing unit and in which the irradiated terahertz waves are directly incident to the first image capturing unit, and
wherein the control unit is configured to control the plurality of image capturing systems such that the timing of a period of image capturing of the first image capturing unit and the timing of a period of irradiation of the terahertz wave of the second irradiation unit is different.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using embodiments. In each diagram, the same reference signs are applied to the same members or elements, and duplicate description will be omitted or simplified.

Note that although a plurality of features is described in the following exemplary embodiments, not all of the plurality of features are necessary for the present invention, and the plurality of features may be optionally combined. Further, in the present specification, terahertz waves include electromagnetic waves within the frequency range of 30 GHz to 30 THz. The concept of electromagnetic waves can also include visible light, infrared light, and radio waves such as a millimeter wave.

First Embodiment

An inspection system 100 according to a first embodiment of the present invention will be explained with reference to FIGS. 1 to 9.

Figure 1A:
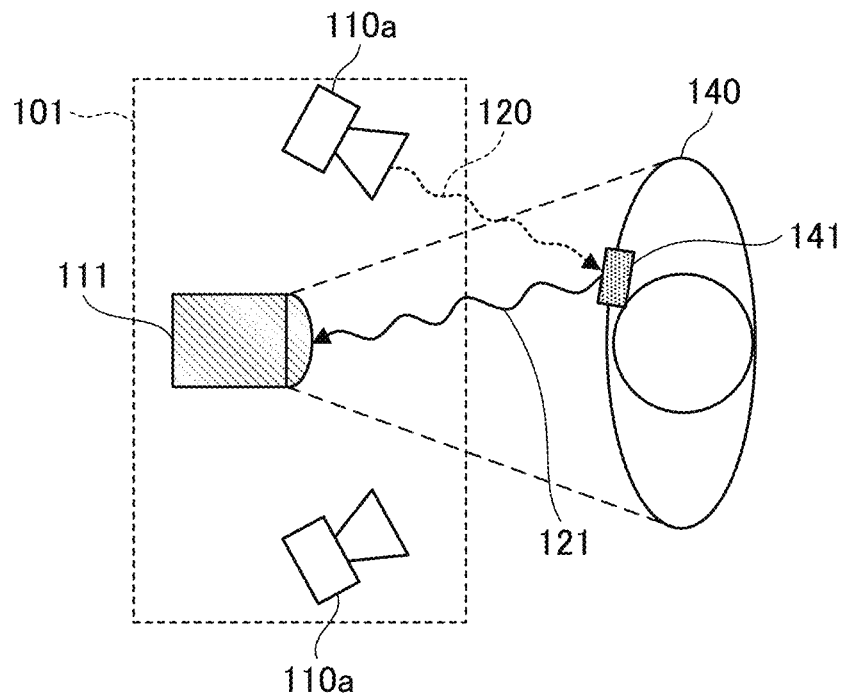
FIGS. 1A and 1B are diagrams explaining a configuration of an image capturing system in exemplary embodiments of the present invention.

FIG. 1 is a diagram explaining a configuration of an image capturing system in an exemplary embodiment of the present invention. FIG. 1A is a schematic diagram showing a configuration of an image capturing system in the first embodiment. The image capturing system 101 is provided with an illumination unit 110 (also referred to as an irradiation unit, or terahertz illumination) and an image capturing unit 111. The image capturing system 101 is what is termed an active terahertz system that irradiates an inspection target 140 with a terahertz wave 120, detects a terahertz wave 121 (reflected wave) reflected from the inspection target, and captures an image based on the intensity thereof.

The illumination unit 110 includes one or more illumination modules, of which one illumination module is referred to as "110a" for convenience. In the following explanation, in a case in which a plurality of illumination units 110 and a plurality of image capturing units 111 are distinguished from each other, a suffix is added after the reference sign, such as illumination unit 110"a", image capturing unit 111"a", and image capturing system 101"a".

In a case in which it is not necessary to distinguish between each of an illumination unit, an image capturing unit, and an image capturing system, these are simply disclosed as the "illumination unit 110," the "image capturing unit 111," and the "image capturing system 101". The same also applies to other configuration elements. Note that an illumination unit and an image capturing unit having the same suffix are in correspondence with each other. That is, the illumination unit 110a corresponds to the image capturing unit 111a, and the image capturing unit 111a captures terahertz waves 121 reflected from the inspection target 140 that has been irradiated by the terahertz wave by the illumination unit 110a.

The image capturing unit 111 is provided with an image capturing sensor having a high sensitivity to a terahertz wave, detects the terahertz wave 121 reflected from the inspection target, and performs image capture. Further, the image capturing unit 111 is provided with a lens (not shown), and includes an image capturing angle of view in each of a horizontal direction and a vertical direction. Note that the illumination unit 110 also has a similar irradiation angle. The illumination unit 110 and the image capturing unit 111 may be incorporated in the same housing or may be provided in separate devices connected via a signal path or the like.

In the image capturing system 101, the illumination unit 110 and image capturing unit 111 are disposed so that the terahertz wave 120 irradiated from the illumination unit 110 is not directly incident to the image capturing unit 111. That is, the terahertz wave radiated from the illumination unit 110a of the image capturing system 101a is not directly incident to the image capturing unit 111a of the image capturing system 101a.

Here, in an illumination unit between a plurality of image capturing systems (101a, 101b, . . . ), this is not limited thereto. Here, it is not assumed that the terahertz wave 120 that is irradiated from the illumination unit 110a of the image capturing system 101a is not directly incident to the image capturing unit 111b of the image capturing system 101b.

In the image capturing system 101, the inspection target 140 is usually a person, but may also be an animal or a robot other than a person. The terahertz wave passes through a fabric or the like. Thereby, a processor (such as an integration system 160 to be described below) that is connected to the inspection system 100 can detect a dangerous object 141, such as a firearm, a knife, and the like, based on an image provided from the image capturing system 101 of the inspection system 100.

Figure 1B:
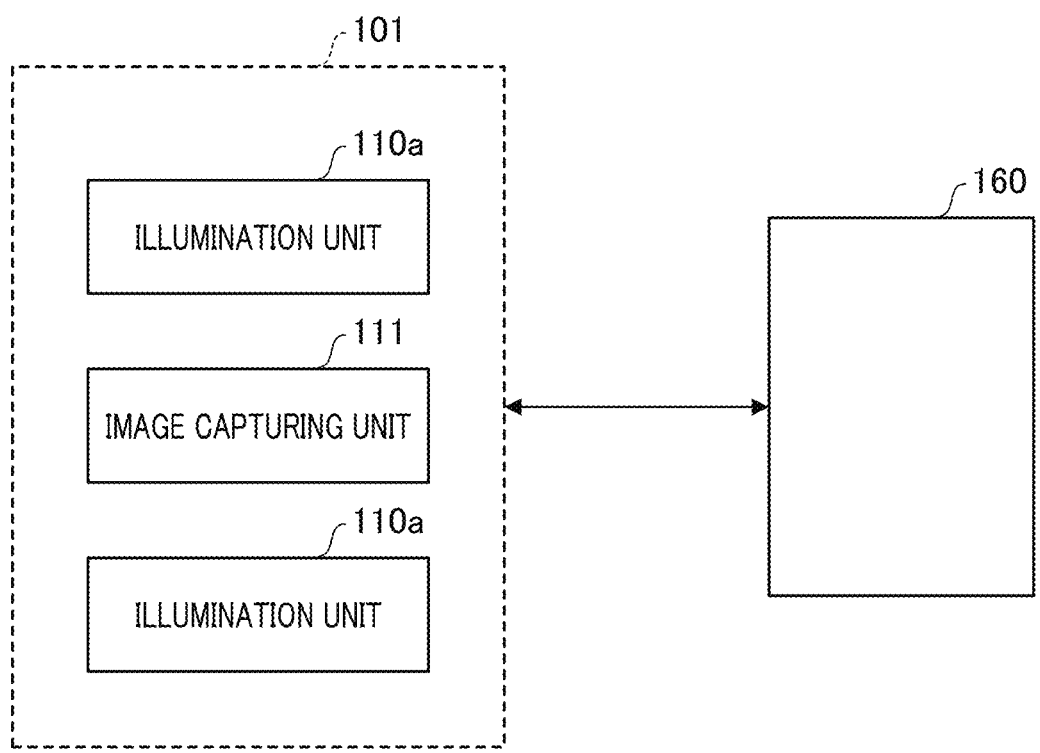

FIG. 1B is a block diagram showing a configuration example of the image capturing system in the first embodiment. The inspection system 100 of the first embodiment may be provided with an integration system 160. The integration system 160 can function as a control unit that performs processing of a signal output from the image capturing system 101 to generate an image, as well as performing illumination control of the illumination unit 110 and image capturing control of the image capturing unit 111 of the image capturing system 101.

Note that although an example in which a plurality of image capturing systems 101 are controlled by one integration system 160 will be explained here, each of the image capturing systems 101 may be controlled by a different integration system 160. Note that the integration system 160 may be incorporated in the same housing as the image capturing system 101, or may be provided in a separate apparatus that is connected to the image capturing system 101 via a signal path.

The integration system 160 may also include determining a risk degree related to the inspection target 140. The processing may include specifying the position of an inspection target 140 that has a predetermined risk degree. Alternatively, the processing may include specifying the seat of the inspection target 140, for example, based on a ticket or the like passed through an inspection device 130 when the inspection target 140 that has a predetermined risk degree passes through the inspection device 130 to be described below.

The integration system 160 may be configured by, for example, a programmable logic device (PLD) such as a field programmable gate array (FPGA), a processor such as an application specific integrated circuit (ASIC), a program-installed general-purpose or dedicated computer, or a combination of all or a part thereof.

Figure 2:
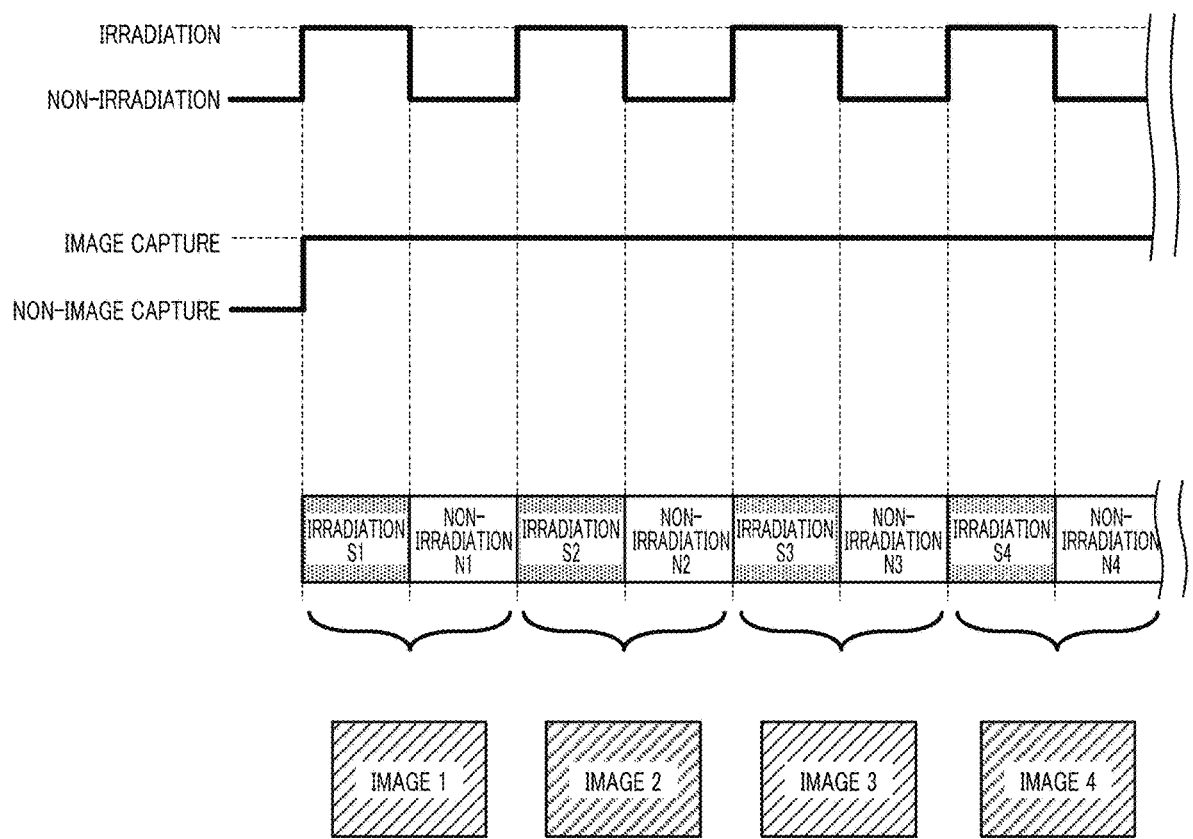
FIG. 2 is a schematic diagram of a timing chart and an image generation in an image capturing system according to a first embodiment.

FIG. 2 is a schematic diagram of a timing chart and an image generation in the image capturing system 101 according to a first embodiment. Although the image capturing unit 111 in the first embodiment is provided with an image capturing sensor that has a high sensitivity to terahertz waves, the noise signal component of the sensor itself is also large, and it is necessary to remove the noise signal component. Therefore, after irradiation by the illumination unit 110, there is a period during which the illumination unit 110 does not irradiate, and image capture is performed during each of the irradiation period and the non-irradiation period.

In addition, a signal (Nn) obtained at the time of non-irradiation is subtracted from a signal (Sn, wherein hereinafter, n=1, 2 . . . ) obtained at the time of irradiation, and the processing of generating an image from the signal of Sn-Nn is performed. In the first embodiment, the time of irradiation and the time of non-irradiation are the same for the sake of convenience, but are determined at a predetermined time defined by the environment of illumination unit 110, the image capturing unit 111, or the image capturing system 101, and an explanation of the determination method of time is omitted here.

Further, the image capturing operation of the image capturing unit 111 shall continue to operate in the first embodiment for convenience, and a processor (such as the integration system 160) shall acquire respective image signals in accordance with the irradiation of the illumination unit 110. However, there is no problem even if image capture and non-image capture control is performed in accordance with the irradiation or non-irradiation of the illumination unit 110. A detailed explanation thereof will be omitted here.

Figure 3:
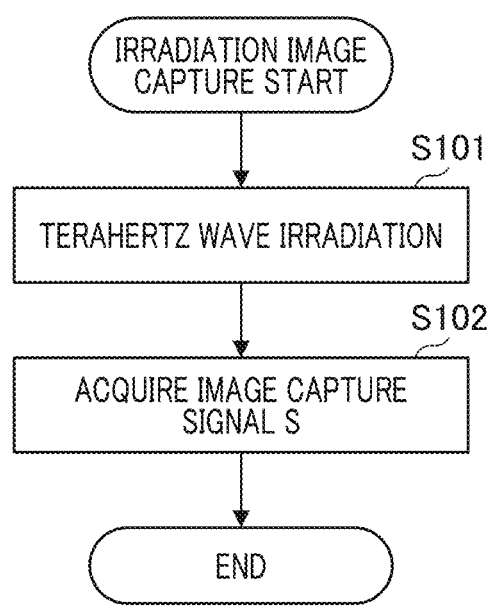
FIG. 3 is a flowchart of acquisition of an image capture signal (Sn) at a time of terahertz wave irradiation.
Figure 4:
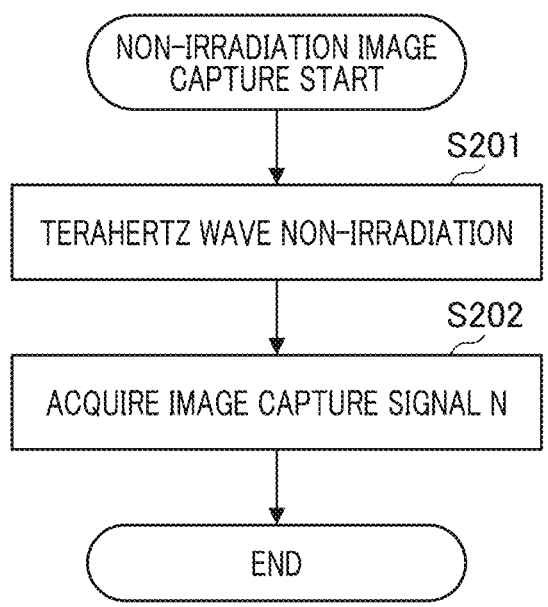
FIG. 4 is a flowchart of acquisition of an image capture signal (Nn) at a time of terahertz wave non-irradiation.
Figure 5:
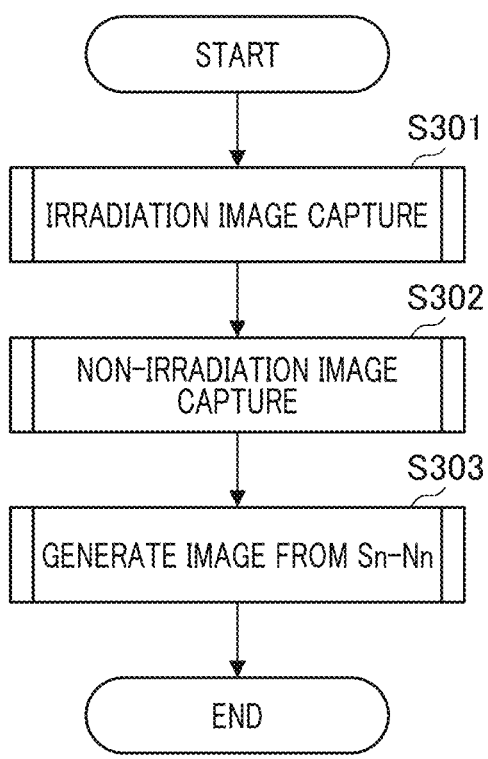
FIG. 5 is a flowchart of image generation.

Next, FIGS. 3 to 5 show a flowchart of image generation in the image capturing system 101. Each of the operations (steps) shown in each flowchart can be executed by executing a computer program stored in a memory by each of the computers in the integration system 160 and performing control of each unit. The same also applies to the following flow charts FIG. 3 is a flowchart of acquisition of an image capture signal (Sn) at a time of terahertz wave irradiation, FIG. 4 is a flowchart of acquisition of an image capture signal (Nn) at a time of terahertz wave non-irradiation, and FIG. 5 is a flowchart of image generation. FIG. 3 shows a subroutine of irradiation image capturing, and FIG. 4 shows a subroutine of non-irradiation image capturing. First, the flow of irradiation image capturing (FIG. 3) will be explained.

Here, in step S101, the corresponding illumination unit 110 of the image capturing system 101 that performs image capturing performs irradiation of a terahertz wave. Then, in step S102, the image capturing unit 111 corresponding to the illumination unit 110 irradiating a terahertz wave performs image capturing, and acquires an image capture signal S.

Next, the flow of non-irradiation image capturing (FIG. 4) will be explained. In step S201, the illumination unit 110 does not irradiate terahertz wave. During this non-irradiation period, in step S202, the image capturing unit 111 performs image capturing, and acquires an image capture signal N.

Next, the flow of image generation (FIG. 5) will be explained. In the flow of image generation, in step S301, the image capturing system 101 performs the irradiation image capturing shown in FIG. 3 and performs the non-irradiation image capturing shown in FIG. 4 in step S302. Next, the processing of Sn-Nn is performed based on the image capture signals Sn and Nn acquired in step S303, and an image is generated based on the obtained image signal.

There is no particular limit to the number of images to be generated, which can vary at any time depending on the total length of a passage 131 of the image capturing system described below in FIG. 6, the angle of view of the image capturing unit 111, and the walking speed of the inspection target 140. Here, a method for determining the number of images to be generated will be omitted.

In the first embodiment, the image capturing unit 111 that detects terahertz waves is a system called an active camera, and may be used in combination with the illumination unit 110, but this is not limited thereto, and the image capturing unit 111 may be a passive type camera.

In this case, an image can be acquired by a terahertz wave that is radiated from the inspection target 140 or the dangerous object 141 without illuminating the inspection target 140 with the terahertz wave 120 that is irradiated from the illumination unit 110.

The inspection system 100 is provided with an image capturing system 101 that acquires an image formed by a terahertz wave that is reflected by the inspection target 140 or by a dangerous object 141 possessed by the inspection target 140, as described above. FIG. 6 is a top view showing an example of a configuration of an inspection device 130 in which an image capturing system 101 included in the inspection system 100 of the first embodiment is disposed.

Figure 7:
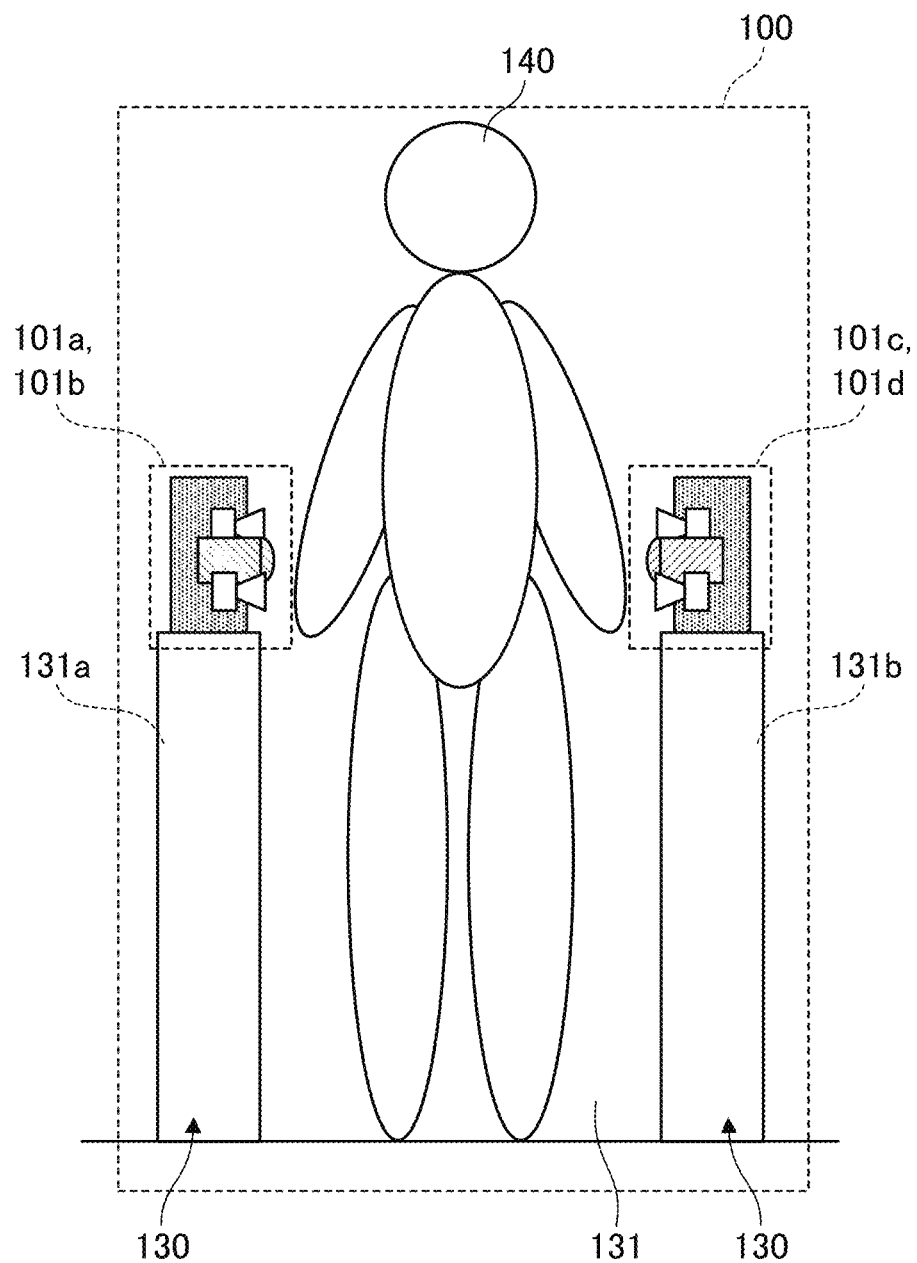
FIG. 7 is a front view showing an example of a configuration of an inspection device in which an image capturing system included in the inspection system of the first embodiment is disposed.

FIG. 7 is a front view showing an example of a configuration of an inspection device 130 in which an image capturing system 101 included in the inspection system 100 of the first embodiment is disposed. The inspection system 100 is installed in various facilities. Examples of facilities include depots of airports and the like, commercial facilities, entertainment facilities, and the like.

The inspection system 100 in the first embodiment is installed in a structure such as an airport. The inspection system 100 of the first embodiment may be an inspection system that is disposed so as to configure part of the surveillance system of an airport.

The inspection device 130 is installed at a security checkpoint at an airport or the like. The inspection image capturing system 101 is disposed so as to acquire an image of an inspection target 140 passing through the passage 131 of the inspection device 130. For example, the image capturing system 101 may capture an image of an inspection target 140 that is entering from an area outside the inspection device 130 to an area that is inside the inspection device.

Hereinafter, an example of a case in which an inspection target 140 passes through (moves through) the passage 131 from an area outside the inspection device toward an area inside the inspection device in the direction indicated by the arrow shown in FIG. 6 will be explained. Note that the direction of the arrow on FIG. 6 is the direction toward the front side in FIG. 7.

Figure 6:
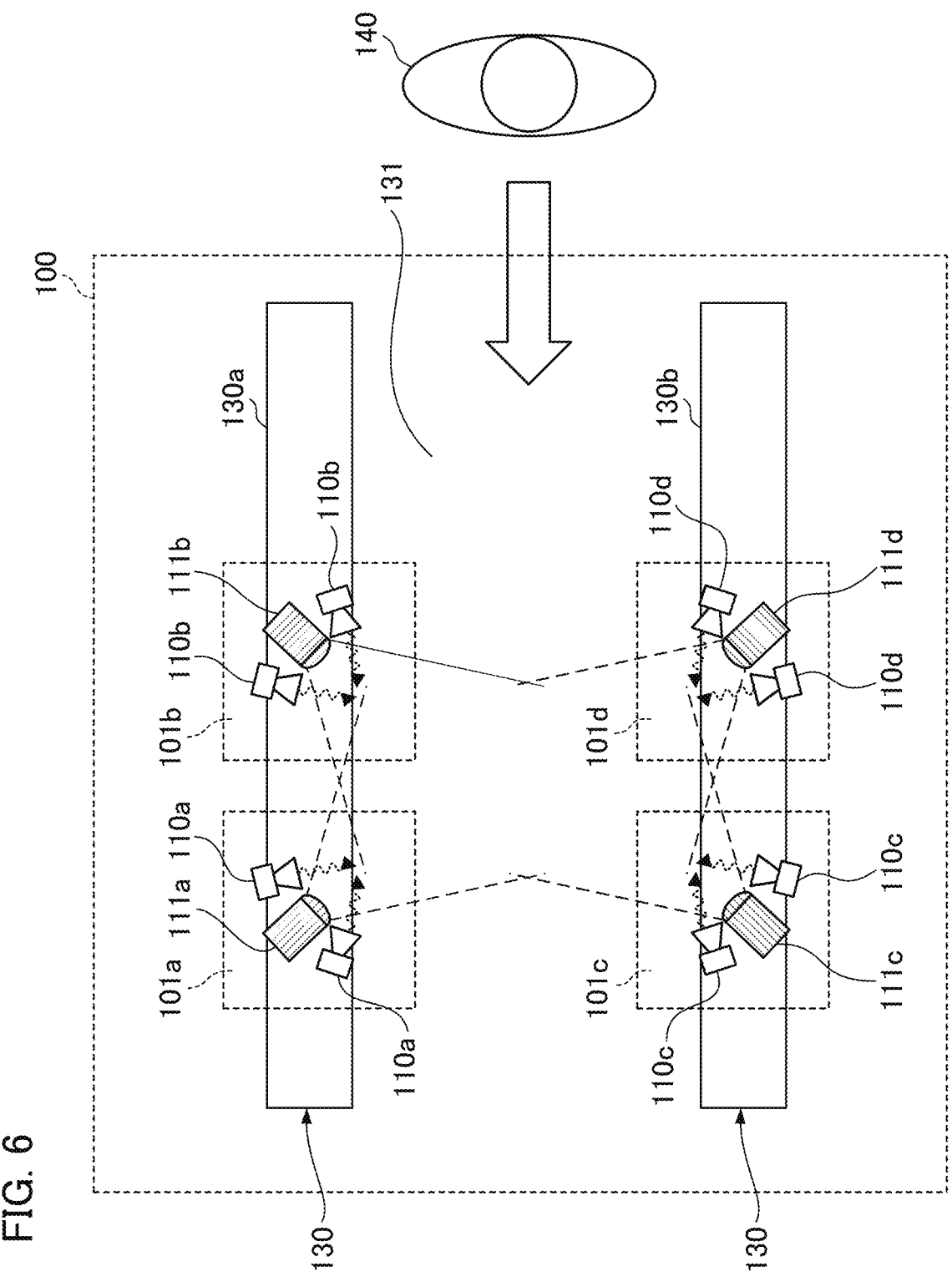
FIG. 6 is a top view showing an example of a configuration of an inspection device in which an image capturing system included in the inspection system of the first embodiment is disposed.

In the configuration shown in FIGS. 6 and 7, the inspection device 130 includes image capturing systems 101*a* and 101*c*, and image capturing systems 101*b* and 101*d*, that are disposed relative to each other across the passage 131. In other words, the inspection device 130 includes a pair of side wall portions 103*a* and 103*b* that form a passage 131 through which the inspection target 140 passes, and the image capturing systems 101*a* and 101*b* are disposed on one side wall portion 103*a*, and the image capturing systems 101*b* and 101*d* are disposed on the other side wall portion 103*b*.

The width and total length of the passage 131 of the inspection device 130 can be determined by the image capturing systems 101*a*, 101*b*, 101*c*, and 101*d*. The image capturing systems 101*a* and 101*b* are disposed on the side wall portion 130*a* of the inspection device 130, and capture each of an image of the front of the right half of the body and the rear of the right half of the body of the inspection target. The image capturing systems 101*c* and 101*d* are disposed on the side wall portion 130*b* of the inspection device 130, and capture each of an image of the front of the left half of the body and the rear of the left half of the body of the inspection target.

That is, the image capturing systems 101a, 101b, 101c, and 101d each capture an image of the inspection target 140 from different directions. By disposing a plurality of image capturing systems, the whole body of the inspection target 140 can be inspected. However, the four image capturing systems described above are merely examples, and image capturing systems may be disposed as three or less, or as five or more.

Although the image capturing system 101 may be disposed at any position in the inspection device 130 provided that it can capture an image of the inspection target 140, it is preferable that the plurality of image capturing systems 101 can capture an image of the inspection target 140 from all directions. The position at which the image capturing system 101 is disposed may be at the front side or at the rear side of the inspection target in the direction of travel, and the height direction may be positioned at any height.

Further, the image capturing system 101 of the inspection system 100 may include a sensor (not shown) that detects that the inspection target 140 has approached. For example, a sensor may be disposed in the inspection device 130. In addition, for example, a sensor may be attached to the illumination unit 110 or the image capturing unit 111.

In this case, the illumination unit 110 is controlled based on the output of the sensor. For example, in response to the detection of the inspection target 140 by the sensor, the illumination unit 110 may begin the irradiation of the terahertz wave. Thereby, the power consumed by the image capturing system 101 can be reduced.

Further, it is preferable that the side surface on the passage 131 side of the inspection device 130 configures a reflection surface that reflects the terahertz wave. That is, the side surface of the passage 131 of the inspection device 130 is a metal, or is preferably provided with a rough surface having an unevenness of about 1/10th of the wavelength of a terahertz wave. Further, for example, the inspection device 130 may be provided with a gantry structure that includes an upper structure (not shown) so that the terahertz wave is further reflected.

At this time, the surface of the passage side of the upper structure may be a metal or is provided with a rough surface having an unevenness of about 1/10th of the wavelength of the terahertz wave. By reflecting or scattering the terahertz wave on the surface of the inspection device 130, the inspection target 140 is illuminated from various angles, and the quality of the image obtained by the image capturing unit 111 can be improved.

Figure 8:
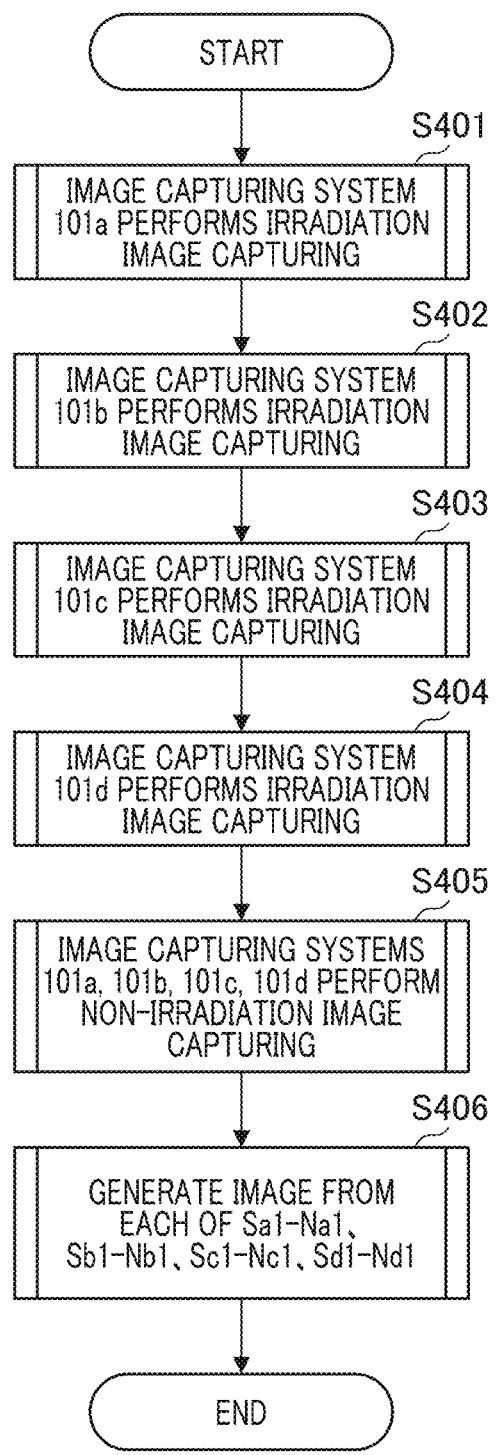
FIG. 8 is a diagram showing an example of a flowchart of the inspection system in the first embodiment.

Next, the operation of the inspection system 100 will be explained with reference to FIGS. 8 and 9. FIG. 8 is a diagram showing an example of a flowchart of the inspection system 100 in the first embodiment. Here, the inspection system 100 that is provided with the four image capturing systems 101 described above will be explained as an example.

In the flow of FIG. 8, an operation in which an image based on terahertz waves (sometimes referred to as a terahertz image) is acquired by the inspection system 100 is explained. First, in step S401, the image capturing system 101a performs irradiation image capturing, and obtains an image signal Sa1. Specifically, in a state in which the terahertz wave is irradiated from the illumination unit 110a of the image capturing system 101a, the image capturing unit 111a performs image capturing, and obtains the image signal Sa1.

In step S402, the image capturing system 101b performs irradiation image capturing, and obtains an image signal Sb1. Specifically, in a state in which the terahertz wave is irradiated from the illumination unit 110b of the image capturing system 101b, the image capturing unit 111b performs image capturing, and obtains the image signal Sb1.

In step S403, the image capturing system 101c performs irradiation image capturing, and obtains an image signal Sc1. Specifically, in a state in which the terahertz wave is irradiated from the illumination unit 110c of the image capturing system 101c, the image capturing unit 111c performs image capturing, and obtains the image signal Sc1.

In step S404, the image capturing system 101d performs irradiation image capturing, and obtains an image signal Sd1. Specifically, in a state in which the terahertz wave is irradiated from the illumination unit 110d of the image capturing system 101d, the image capturing unit 111d performs image capturing, and obtains the image signal Sd1.

Note that although irradiation image capturing is performed for each image capturing system, and here, the order is image capturing systems 101a, 101b, 101c, and 101d, the order can be different, and each of the image capturing systems 101 can acquire an image signal S regardless of the order.

Next, in step S405, the image capturing systems 101a, 101b, 101c, and 101d perform non-irradiation image capturing, and obtain each of the image signals Na1, Nb 1, Nc1, and Nd1. Next, in step S406, the integration system 160 performs processing of the image signals, specifically, Sa1-Na1, Sb1-Nb1, Sc1-Nc1, and Sd1-Nd1, and generates each of the images 101a1, 101b1, 101c1, and 101d1, and the series of flows ends.

The integration system 160 uses the generated images 101a1, 101b1, 101c1, and 101d1 to detect the position of the dangerous object 141 of the inspection target 140 having a predetermined risk degree in a predetermined procedure, and notifies an administrator. Thereby, in a public transportation facility such as an airport, it becomes possible to prevent crimes committed with a concealed dangerous object.

Figure 9:
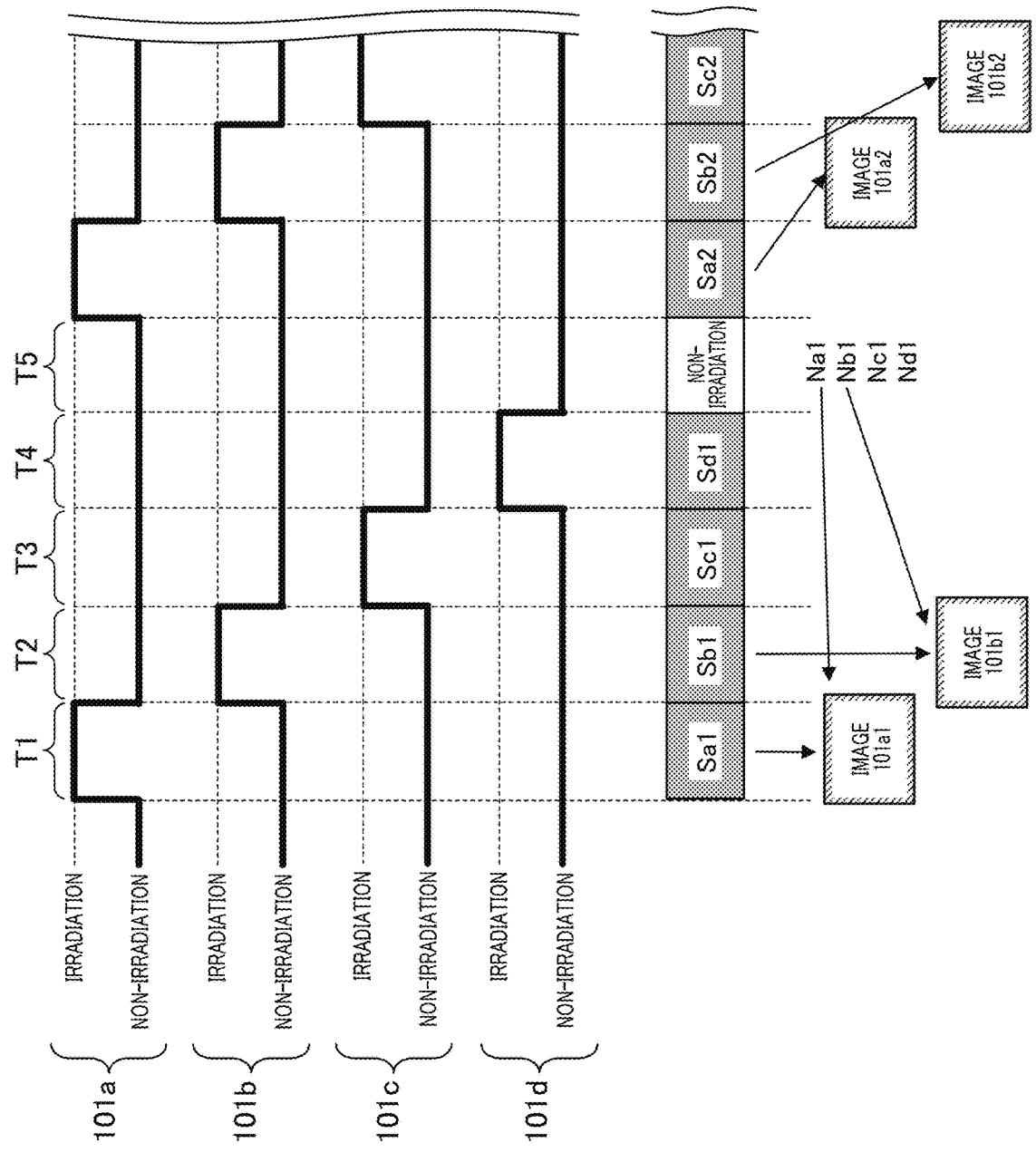
FIG. 9 is a schematic diagram of a timing chart and an image generation in the image capturing system according to the first embodiment.

FIG. 9 is a schematic diagram of a timing chart and an image generation in the image capturing system 101 according to the first embodiment. As explained in the flow of FIG. 8, in the first embodiment, each image capturing system performs irradiation image capturing at different timings. In other words, the integration system 160 performs control so that the image capturing unit 111 does not perform image capturing during the period of terahertz wave irradiation of the non-corresponding illumination unit 110.

As shown in the present figure, in the period T1, the image capturing system 101a performs irradiation image capturing (acquisition of the image signal Sa1). In this period T1, the illumination unit 110a corresponding to the image capturing unit 111a of the image capturing system 101a is in an irradiation period, but the illumination units 110b, 110c, and 110d, which do not correspond to image capturing unit 111a of the image capturing system 101a, are in a non-irradiation period. Then, in the periods T2 to T4, during which the other image capturing systems 101b to 101d are performing irradiation image capturing, the image capturing system 101a enters a non-image capturing period.

Similarly with respect to the image capturing systems 101b to 101d, in a period during which image capturing systems 101b to 101d are performing irradiation image capturing, an illumination unit corresponding to the image capturing unit of the image capturing system performing irradiation image capturing is in an irradiation period, but a non-corresponding illumination unit is in a non-irradiation period. Further, the period during which another image capturing system is performing irradiation image capturing becomes a non-image capturing period.

In addition, in the period T5, all of the illumination units 110a to 110d are made a non-irradiation period during which terahertz wave irradiation is not performed, and in this period, all of the image capturing systems 101a to 101d perform non-irradiation image capturing (acquisition of an image signal N).

Note that although the non-irradiation image capturing of the image capturing systems 101a to 101d is preferably simultaneous, it is sufficient to perform each during a period during which all the illumination units 110a to 110d are non-irradiated, and they do not have to be performed completely simultaneously. The periods T1 to T5 being made one cycle, the inspection system 100 performs image generation.

Thereby, by controlling the periods of irradiation image capturing and non-irradiation image capturing of each image capturing system, it is possible to arrange a large number of image capturing systems while maintaining image quality without requiring complicated arrangement adjustment of terahertz illumination and cameras (image capturing units). Further, inspection time in a case in which a large number of image capturing systems are used for performing inspection is reduced, and convenience is not impaired, and this is advantageous for crime prevention.

Second Embodiment

Figure 10:
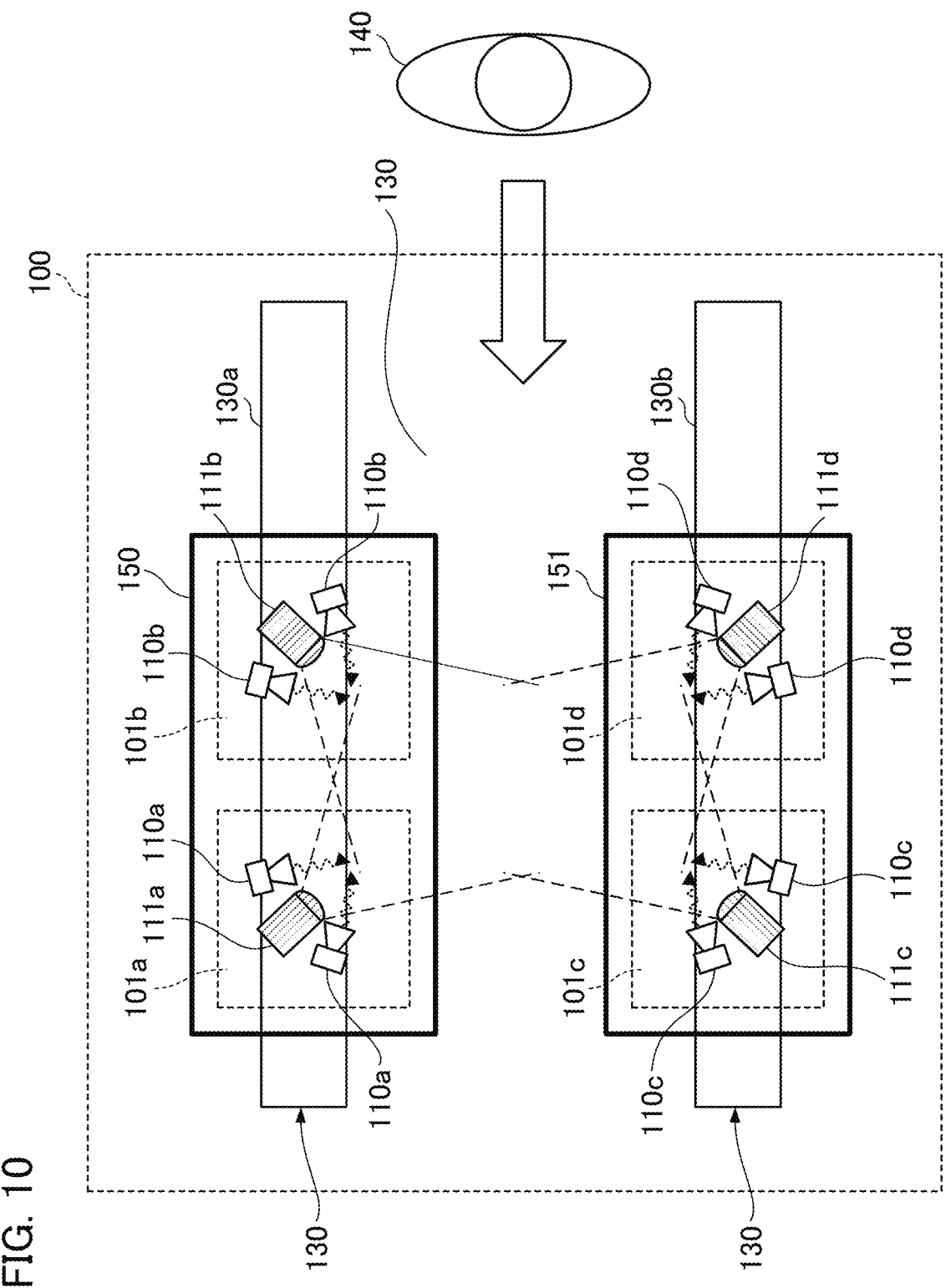
FIG. 10 is a top view showing an example of a configuration of an inspection device in which an image capturing system included in an inspection system of a second embodiment is disposed.

The inspection system 100 in the second embodiment will be explained with reference to FIGS. 10 to 12. FIG. 10 is a top view showing an example of a configuration of an inspection device 130 in which an image capturing system 101 included in an inspection system 100 of the second embodiment is disposed. The inspection device shown in FIG. 10 has a configuration similar to that of FIG. 6.

Here, an image capturing module 150 includes the image capturing system 101a and the image capturing system 101b, and similarly an image capturing module 151 includes the image capturing system 101c and the image capturing system 101d. The image capturing module is one group that includes one or a plurality of image capturing systems. The image capturing systems in the same image capturing module are made a combination (group) of image capturing systems in which a terahertz wave from the illumination unit 110 is not directly mutually irradiated to the image capturing unit 111.

Specifically, a terahertz wave that is irradiated from the illumination unit 110a of the image capturing system 101a is not directly irradiated to the image capturing unit 111b of the image capturing system 101b. In addition, conversely, a terahertz wave that is irradiated from the illumination unit 110b of the image capturing system 101b is also not directly irradiated to the image capturing unit 111a of the image capturing system 101a.

In addition, the same also applies with respect to the image capturing module 151, and a terahertz wave irradiated from the illumination unit 110c of the image capturing system 101c is not directly irradiated to the image capturing unit 111d of the image capturing system 101d. In addition, conversely, a terahertz wave that is irradiated from the illumination unit 110d of the image capturing system 101d is also not directly irradiated to the image capturing unit 111c of the image capturing system 101c.

Here, a terahertz wave of the illumination unit 110 that does not directly irradiate the image capturing unit 111 means that the terahertz wave 120 irradiated from the illumination unit 110 is not incident to the image capturing sensor of the image capturing unit 111, and no incident reflected wave or the like of the irradiated terahertz wave is included. In addition, it can be said that the image capturing direction of the image capturing units 111 of the image capturing system 101 that become the same group are not opposed to each other.

In other words, the image capturing units 111, which are approximately opposed in the direction of image capturing, will belong to different groups. Here, approximately opposed in the direction of image capture includes not only a case in which the direction of image capture is completely opposed, but also a case in which a part of image capturing angle of view is opposed.

That is, the integration system 160 performs control by dividing the plurality of image capturing systems into a plurality of groups based on the image capturing direction of each of the image capturing units 111 and the terahertz wave irradiation direction of each of the illumination units 110 of the plurality of image capturing systems 101.

Here, although an image capturing module is one combination of image capturing systems on the same sidewall of the inspection device 130, the image capturing module is not limited thereto provided that the combination is one in which the terahertz waves are not directly irradiated to the respective image capturing units 111. For example, as shown in FIG. 11, the image capturing system 101b and the image capturing system 101d may be the image capturing module 152, and the image capturing system 101a and the image capturing system 101c may be the image capturing module 153.

Figure 11:
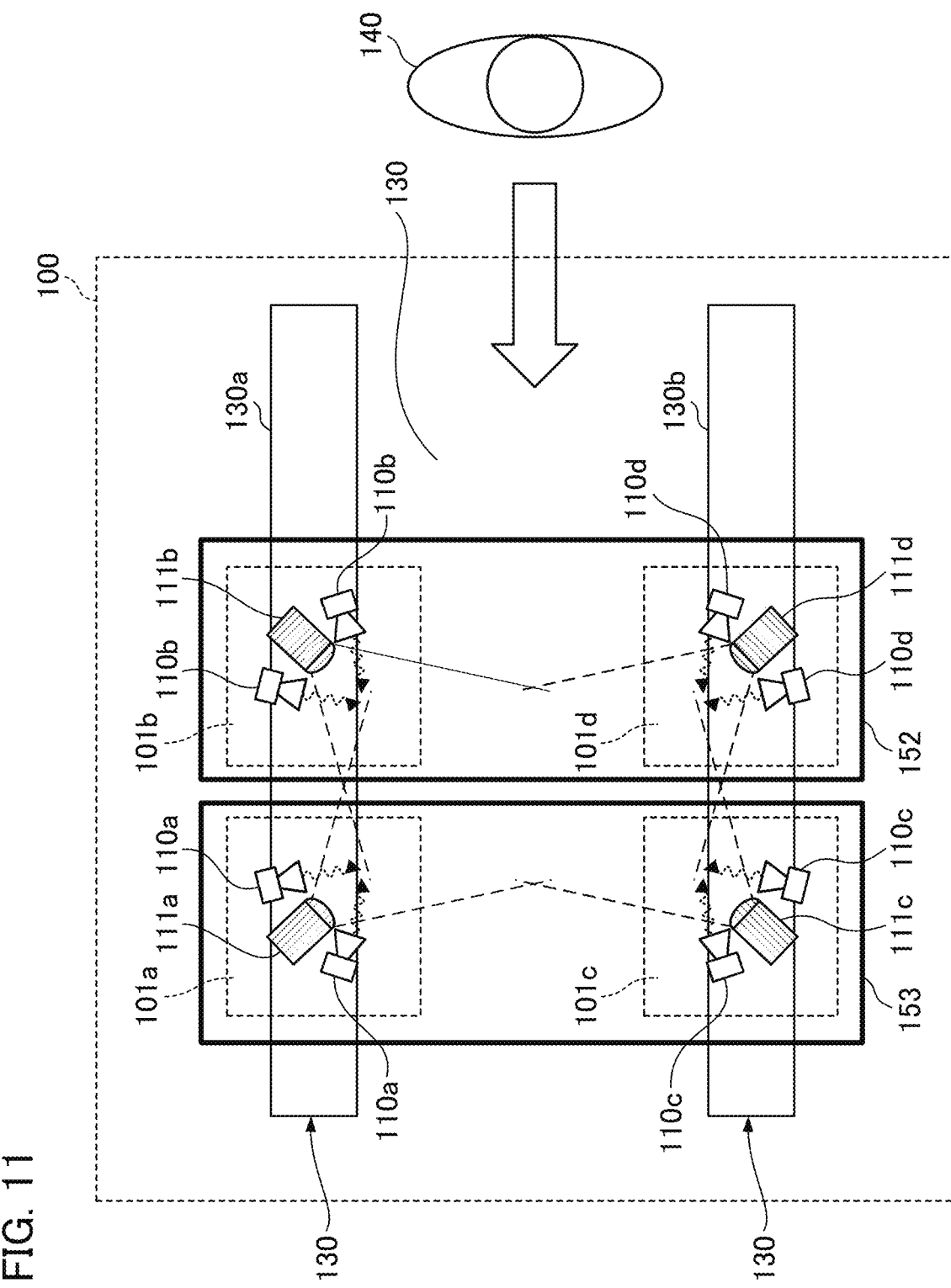
FIG. 11 is a schematic diagram showing another example of a grouping of the image capturing system in the second embodiment.
Figure 12:
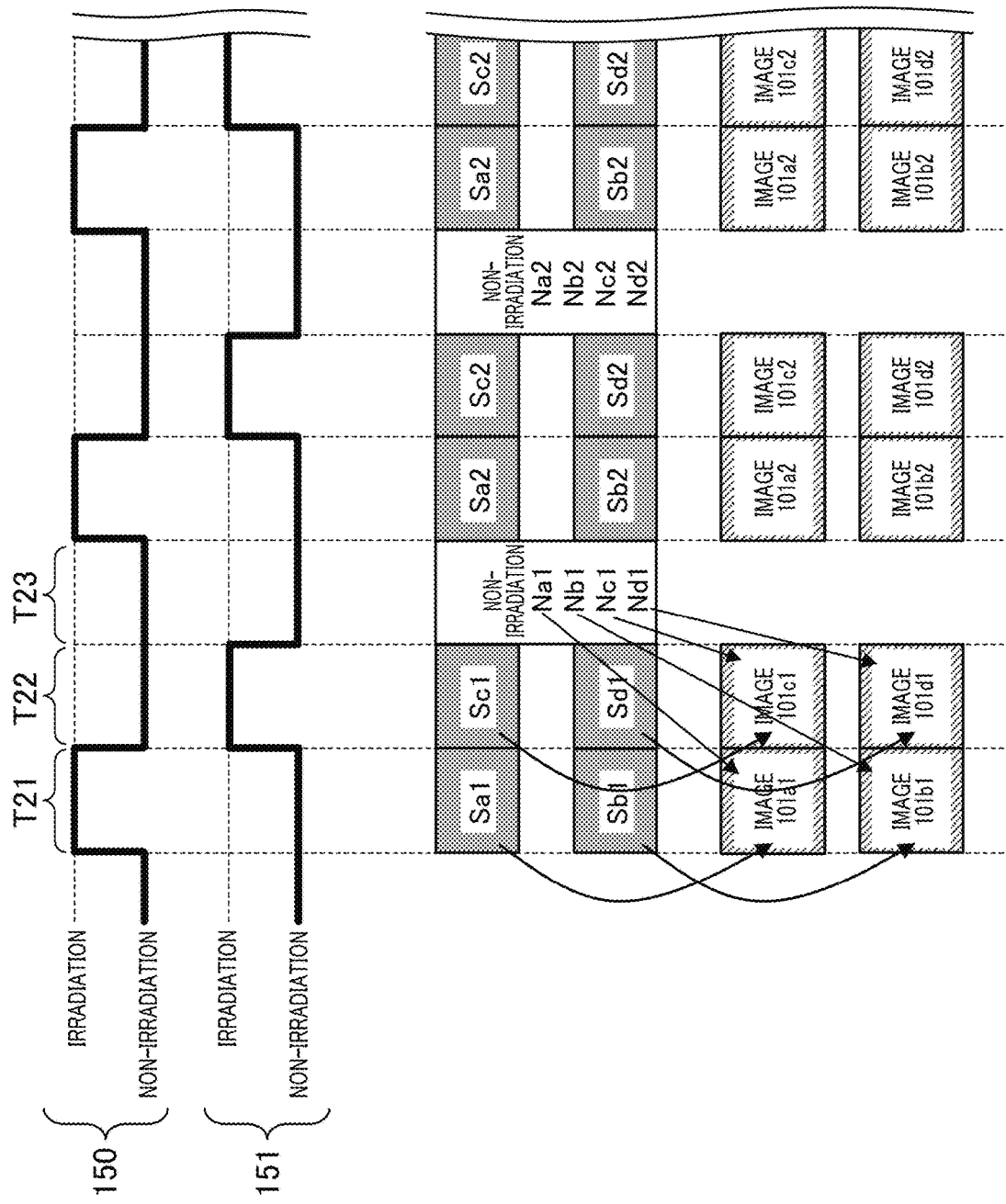
FIG. 12 is a schematic diagram of a timing chart and an image generation in the image capturing system according to the second embodiment.

Note that, FIG. 11 is a schematic diagram showing another example of a grouping of the image capturing system 101 in the second embodiment. In addition, although the number of image capturing systems included in one imaging module in the second embodiment is two, there may be three or more, provided that the combination is one in which the terahertz waves are not directly irradiated to the respective image capturing units 111.

Next, the operation of the inspection system 100 will be explained using FIG. 12. FIG. 12 is a schematic diagram of a timing chart and an image generation in the image capturing system according to the second embodiment. First, in a period T21, the imaging module 150 performs irradiation image capturing, and each of the image capturing systems 101a and 101b obtain image signals Sa1 and Sb1.

Next, in a period T22, the image capturing module 151 performs irradiation image capturing, and the image capturing systems 101c and 101d each obtain of the image signals Sc1 and Sd1. Next, in a period T23, the image capturing modules 150 and 151 perform non-irradiation image capturing, and the image capturing systems 101a, 101b, 101c, and 101d each obtain of the image signals Na1, Nb1, Nc1, and Nd1.

In addition, the integration system 160 performs processing of the image signals, that is, Sa1-Na1, Sb1-Nb1, Sc1-Nc1, and Sd1-Nd1, and generate each of the images 101a1, 101b1, 101c1, and 101d1. When necessary, a plurality of images is generated by performing this processing a plurality of times, and the series of flows ends.

As described above, in the second embodiment, the integration system 160 controls the plurality of image capturing systems 101 so that timing of the periods of irradiation image capturing of the different groups is different. By performing such control, it is possible to further shorten the inspection time compared to the first embodiment.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions. In addition, as a part or the whole of the control according to the embodiments, a computer program realizing the function of the embodiments described above may be supplied to the inspection system through a network or various storage media. Additionally, a computer (or a CPU, an MPU, or the like) of the inspection system may be configured to read and execute the program. In such a case, the program and the storage medium storing the program configure the present invention.

This application claims the benefit of Japanese Patent Application No. 2021-156808 filed on Sep. 27, 2021, which is hereby incorporated by reference herein in its entirety.

What is claimed is:

1. An inspection system comprising:
   a plurality of image capturing systems each of which includes:
   an illuminator that irradiates a terahertz wave to an inspection target, and
   an image capturing sensor that captures an image of the inspection target by detecting a reflected wave from the inspection target that has been irradiated with the terahertz wave by a corresponding illuminator, and
   at least one processor or circuit programmed to
   control the illuminator and the image capturing sensor of each of the plurality of image capturing systems,
   wherein the plurality of image capturing systems includes:
   a first image capturing sensor,
   a first illuminator corresponding to the first image capturing sensor, and
   a second illuminator that does not correspond to the first image capturing sensor but corresponds to a second image capturing sensor and in which the irradiated terahertz waves are directly incident to the first image capturing sensor, and
   wherein the at least one processor or circuit is configured to control the plurality of image capturing systems such that the timing of a period of image capturing of the first image capturing sensor and the timing of a period of irradiation of the terahertz wave of the second illuminator is different, and
   wherein each of the plurality of image capturing systems is controlled to perform image capturing and irradiation based on a predetermined cycle.

2. The inspection system according to claim 1, wherein the at least one processor or circuit is further configured to control the image capturing system so as to have:
   a first image capturing period during which the image of the inspection target is captured in a state in which the terahertz waves are irradiated by each of an illuminator,
   a second image capturing period during which an image of the inspection target is captured in a state in which each of the illuminators is not irradiating, and
   a non-image capturing period during which image capturing is not performed.

3. The inspection system according to claim 2, wherein the at least one processor or circuit is configured to control the plurality of image capturing systems such that the timing of at least the first image capturing period of the image capturing systems that include the image capturing sensors substantially facing each other in the image capturing direction are different from each other.

4. The inspection system according to claim 2, wherein the at least one processor or circuit is further configured to control the plurality of image capturing systems such that the second image capturing period of the plurality of image capturing systems belongs to a same predetermined period.

5. The inspection system according to claim 2, wherein the at least one processor or circuit is further configured to control the plurality of image capturing systems such that the timing of the first image capturing period of each of the plurality of image capturing systems is different from each other.

6. The inspection system according to claim 2, wherein the at least one processor or circuit is further configured to divide the plurality of image capturing systems into a plurality of groups based on an image capturing direction of each of the image capturing sensors and an irradiation direction of each of the illuminators of the plurality of image capturing systems, and control the plurality of image capturing systems such that the timing of the first image capturing period of the different groups is different.

7. The inspection system according to claim 2, wherein the at least one processor or circuit is further configured to generate a third image by using the first image captured in the first image capturing period, and a second image captured in the second image capturing period.

8. The inspection system according to claim 1, wherein the at least one processor or circuit is further configured to cause the illuminator to repeat irradiation and non-irradiation of the terahertz wave at the predetermined cycle.

9. The inspection system according to claim 1, wherein the plurality of image capturing systems are disposed in a pair of side wall portions forming a passage through which the inspection target passes, so as to capture an image of the inspection target from different directions.

10. A control method of an inspection system having
    a plurality of image capturing systems each of which includes:
    an illuminator that irradiates a terahertz wave to an inspection target, and
    an image capturing sensor that captures an image of the inspection target by detecting a reflected wave from the inspection target that has been irradiated by the terahertz wave by the corresponding illuminator,
    wherein the plurality of image capturing systems includes:
    a first image capturing sensor,
    a first illuminator corresponding to the first image capturing sensor, and
    a second illuminator that does not correspond to the first image capturing unit, but corresponds to a second image capturing sensor, and in which the irradiated terahertz wave is directly incident to the first image capturing sensor, and
    wherein the control method includes a control step of controlling the illuminator and the image capturing sensor of each of the plurality of the image capturing systems such that the timing of a period of image capturing of the first image capturing sensor and the timing of a period of irradiation of the terahertz wave of the second image capturing sensor is different;
    wherein each of the plurality of image capturing systems is controlled to perform image capturing and irradiation based on a predetermined cycle.

11. A non-transitory computer-readable storage medium configured to store a computer program to control an inspection system having a plurality of image capturing systems each of which includes
 an illuminator that irradiates a terahertz wave to an inspection target, and
 an image capturing sensor that captures an image of an inspection target by detecting a reflected wave from the inspection target that has been irradiated with the terahertz wave by the corresponding illuminator,
wherein the plurality of image capturing systems includes:
a first image capturing sensor,
a first illuminator corresponding to the first image capturing sensor, and
a second illuminator that does not correspond to the first image capturing unit, but corresponds to a second image capturing sensor, and in which the irradiated terahertz wave is directly incident to the first image capturing unit,
wherein the computer program comprises instructions for executing following process: a control step of controlling the illuminator and the image capturing sensor of each of the plurality of the image capturing systems such that the timing of a period of image capturing of the first image capturing sensor and the timing of a period of irradiation of the terahertz wave of the second image capturing sensor is different;
wherein each of the plurality of image capturing systems is controlled to perform image capturing and irradiation based on a predetermined cycle.

12. The inspection system according to claim 1, wherein the timing of at least one period of image capturing of the first image capturing sensor and the timing of at least one period of image capturing of the second image capturing sensor is different.

\* \* \* \* \*